May 8, 1945.   J. L. WOODWORTH   2,375,722
CARRIER-CURRENT CONTROL SYSTEM
Filed Sept. 15, 1942
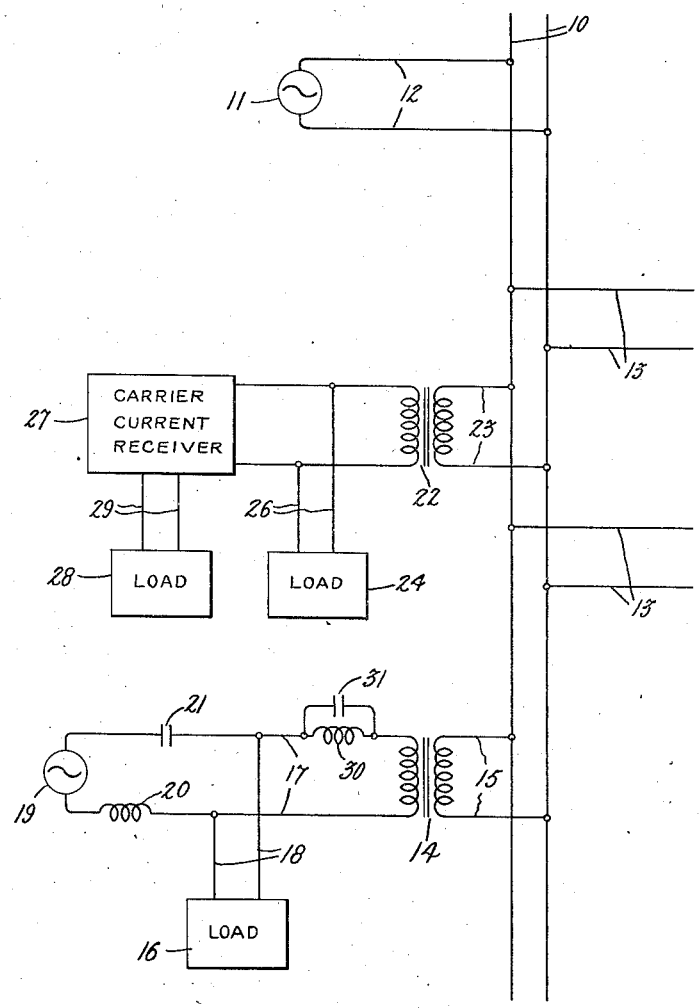
Inventor:
John L. Woodworth,
by Harry E. Dunham
His Attorney.

Patented May 8, 1945

2,375,722

UNITED STATES PATENT OFFICE 2,375,722

CARRIER-CURRENT CONTROL SYSTEM

John L. Woodworth, Schenectady, N. Y., assignor to General Electric Company, a corporation of New York Application September 15, 1942, Serial No. 458,366

3 Claims. (Cl. 177—352)

This invention relates to carrier-current control systems and more particularly to such systems in which carrier current is used to effect the control of loads on a power system at remote points.

Carrier-current control systems are frequently used for controlling the connection of remote loads, such as water heaters and street lights, for example, to power-line buses, such as distribution feeders. One system which has been used in the past comprises passing the carrier voltage into an insulating transformer and then through a reactor and capacitor into a bus of normal frequency, usually sixty cycles. The inductance and capacitor are adjusted for resonance and offer a low impedance at the carrier frequency and a high impedance to the sixty-cycle voltage tending to produce sixty-cycle current through the carrier-current generator.

A different method of connection of the carrier-current generator to the bus has been proposed according to which the insulating transformer is connected in the circuit on the bus side of the reactor and capacitor; that is, the carrier-current voltage passes through the resonant circuit and then into the transformer. This circuit makes possible the use of the regular distribution or station service transformer provided for furnishing power in the station. Frequently, such a transformer is used to step the sixty-cycle bus voltage down from 2300–4000 volts to 230 volts.

This scheme is advantageous in that the cost of the insulating transformer of the first-mentioned arrangement is eliminated and, although the reactor and the capacitor may be of the same physical size, a lower insulating voltage to ground is required in the latter system which may result in lower cost. However, in order to obtain the required carrier voltage on the high-voltage bus, it may be necessary to pass so much carrier current through the station service transformer that the leakage reactance of this transformer will cause an excessively high voltage to appear across the station load while the carrier voltage is applied. This would frequently result in voltage fluctuations and flicker of the lights in the station as well as on any lighting load connected through the station.

Accordingly, it is an object of my invention to provide a new and improved carrier-current control system of the latter type in which the carrier current frequency voltage appearing across the station load is relatively low.

Further objects and advantages of my invention will become apparent as the following description proceeds and the features of novelty which characterize my invention will be pointed out with particularity in the claims annexed to and forming a part of this specification.

For a better understanding of my invention, reference may be had to the drawing which illustrates schematically a carrier-current system embodying the principles of my invention.

In the drawing, there is illustrated a high-voltage bus 10 which may be fed by an alternating-current generator 11 over a circuit 12. Any suitable generating equipment and any suitable connection to the bus may be employed. The bus may be used to transmit energy to one or more distribution feeders 13.

The bus 10 may also be connected to loads, the connection of which is to be controlled from a remote point. For example, water heaters in various locations are frequently arranged to be connected at periods when normal lighting, industrial, and various domestic loads are light, and disconnected as these loads increase. Remote control from a central point is desired so that these peak loads can be varied in accordance with the system load. Similarly, street-lighting loads may be controlled according to light conditions.

As is well known, carrier-current systems have been used for this purpose in which current of a different frequency from that normally existing in the power system is applied to the power lines from a carrier-current frequency generator constituting a transmitter and received at a remote point through a suitable carrier-current receiver. The details of suitable transmitters and receivers of this type are well known.

In the drawing, there is illustrated a distribution transformer 14, the primary of which is connected to the bus 10 by conductors 15 and the secondary of which is connected to a load 16 through conductors 17 and 18. There is indicated by the numeral 19 a carrier-current generator serving as a carrier-current transmitter. The generator is connected to the conductors 17 through an inductance or reactor 20 and a capacitor 21. As is well understood, the reactor 20 and the capacitor 21 are chosen to provide series resonance at the frequency of the generator voltage and, hence, present a low impedance to the carrier frequency and a high impedance to the sixty-cycle current appearing on conductors 17.

There is also shown a second distribution or station transformer 22 connected through conductors 23 to the high-voltage bus 10. The secondary of this transformer may be employed to supply sixty-cycle current to a load 24 over conductors 26. There may also be located at this point a suitable carrier-current receiver, as indicated by the numeral 27, which, of course, will include a suitable resonant circuit tuned to the carrier frequency for supplying current to a load 28 over conductors 29.

In order to obtain the required carrier-current voltage in the high-voltage bus 10 with the apparatus thus far described, it may be necessary to pass so much carrier current through the distribution transformer 14 that the leakage reactance of the transformer will cause an excessively high voltage to appear across the station load 16 when the carrier voltage is applied. The result would be voltage fluctuations and flicker of the station lights and any lighting load connected to the station bus 17. In order to avoid this undesirable condition, means are provided in series with the station load and the transformer 14 having series resonance with the leakage reactance of the transformer at the carrier-current frequency. In the illustrative embodiment of my invention, a parallel, or shunt resonant circuit comprising a reactor, or inductance 30, and a capacitor 31 is connected in series with the secondary of the transformer 14. By choosing or adjusting the values of capacity and inductance in the shunt circuit to have series resonance with the leakage reactance of the power transformer, the impedance to the carrier-current frequency voltage across the transmitting station load is low and the voltage which is caused by the carrier-current frequency voltage across the load is thereby minimized.

While I have shown a particular embodiment of my invention, I do not desire my invention to be limited to the particular construction shown and described and I intend in the appended claims to cover all modifications within the spirit and scope of my invention.

What I claim as new and desire to secure by Letters Patent of the United States is:

1. In a power-supply system including a power-supply line, a distribution transformer connected thereto, a load circuit and a carrier-current transmitting device connected to the secondary winding of said transformer, and means connected in series with said secondary and said load circuit intermediate the secondary and the carrier current device, said means having series resonance with the leakage reactance of said transformer at the carrier-current frequency.

2. In a power-supply system including a power-supply line, a distribution transformer connected thereto, a load circuit and a carrier-current transmitting device connected to the secondary winding of said transformer, and means connected in series with said secondary and said load circuit intermediate the secondary and the carrier current device, said means comprising a parallel resonant circuit having series resonance with the leakage reactance of said transformer at the carrier-current frequency.

3. In a power-supply system including a power-supply line, a distribution transformer connected thereto, a load circuit and a carrier-current transmitting device connected to the secondary winding of said transformer, and means connected in series with said secondary and said load circuit intermediate the secondary and the carrier current device, said means comprising a capacitor and a reactor connected in parallel and being tuned to have series resonance with the leakage reactance of said transformer at the carrier-current frequency.

JOHN L. WOODWORTH.